3,053,907
NITROADAMANTANES AND THEIR PREPARATION

George William Smith, Woodbury, and Harry Douglas Williams, Penns Grove, N.J., assignors to E. I. du Pont de Nemours and Company, Wilmington, Del., a corporation of Delaware
No Drawing. Filed Nov. 21, 1958, Ser. No. 775,393
4 Claims. (Cl. 260—644)

The present invention pertains to a novel method of synthesizing 1,3-diaminoadamantane. More specifically, the present invention relates to a process for preparing 1,3-diaminoadamantane wherein adamantane is nitrated to 1,3-dinitroadamantane which subsequently is hydrogenated.

Diamines in general are recognized valuable intermediates to polymers used in the textile industry. For instance, hexamethylenediamine is polycondensed with adipic acid to produce nylon. Certain diamines such as m-xylylenediamine and p-xylylenediamine also have value as curing agents for epoxy resins. The diamine of the present invention, which is a solid, is applicable to both of the aforementioned utilities and contributes many unique properties to the resulting polymers because of its unusual molecular structure.

The only synthesis of 1,3-diaminoadamantane reported prior to the instant specification is described in Berichte 74, page 1769 (1941). This process comprises subjecting the 1,3-dicarboxy derivative of adamantane to a series of steps, the ultimate aim of which is to prepare the parent compound, adamantane. The diamino derivative is obtained in one of the intermediate reactions. The reactions required to obtain this derivative comprise converting 1,3-dicarboxyadamantane to the diacyl dichloride, treating the diacyl chloride with ammonia to obtain the diamide, and converting the diamide by means of sodium hypobromite. The relative unavailability of the starting material and the time and apparatus required to produce the diamino compound via the described method preclude industrial acceptance of the aforedescribed process despite the potential value of the product.

Accordingly an object of the present invention is to provide a facile synthesis of a unique polymer intermediate. Another object of the present invention is to provide a synthesis for 1,3-diaminoadamantane in which the disadvantages inherent in the prior art process are eliminated. A still further object of the present invention is to provide a method for preparing a novel derivative of of adamantane which is easily convertible to 1,3-diaminoadamantane. Additional objects of the present invention will become apparent to those skilled in the art as the invention is described in greater detail.

We have found that the foregoing objects are achieved by an economical process which comprises nitrating adamantane to the dinitro derivative, separating the dinitro compound from the reaction mixture, and thereafter catalytically hydrogenating 1,3-dinitroadamantane to 1,3-diaminoadamantane. In a preferred embodiment of the present invention, adamantane is treated with concentrated nitric acid in the presence of glacial acetic acid, the reaction temperature and pressure being maintained at above 120° C. and 300 pounds per square inch, respectively, and after being separated, the resulting novel dinitro derivative, i.e., 1,3-dinitroadamantane, is subjected to a conventional catalytic hydrogenation procedure.

Various embodiments of the present invention are shown in the following examples which are illustrative only and are not to be construed as limiting the invention in any manner. In the examples, the parts are parts by weight.

EXAMPLE 1

A. Preparation of 1,3-Dinitroadamantane

A reaction vessel containing 90 parts of adamantane mixed with 500 parts of glacial acetic acid was pressurized to 500 pounds per square inch gage by nitrogen and heated to 140° C. Approximately 119 parts of cencentrated nitric acid (ca. 70%) was added to the reaction mixture at a rate of about 11 parts per minute. After the addition of the nitric acid was completed, the reaction temperature was maintained for an additional ten-minute period by heating. At that time, the pressure was increased to 600 pounds per square inch gage by the introduction of additional nitrogen and the reaction temperature was raised to 170° C. An additional 53 parts of concentrated nitric acid was added to the reaction mixture in the manner described previously. Following this addition, the reaction conditions again were maintained for a ten-minute interval after which the reaction mixture was cooled to room temperature.

The reaction mixture was diluted with approximately 2000 parts of water and subsequently filtered to yield 64 parts of the light-yellow solid. The solid was slurrried with 16 parts of potassium hydroxide, 120 parts of methanol, and 150 parts of water. The alkali-insoluble product was extracted by ethyl ether and repeatedly washed with water. The aqueous ether solution was dried over magnesium sulfate and concentrated. After recrystallization from methanol, 16.2 parts of a solid having a melting point of 214–215° C. was obtained.

The infrared spectrum of the product obtained as outlined above contained strong absorptions at 6.46μ and 7.32μ which are characteristic of nitro groups. Elemental analysis of the product gave the following results:

|  | C | H | N |
|---|---|---|---|
| Calcd. for $C_{10}H_{14}N_2O_4$ | 53.09 | 6.24 | 12.38 |
| Found | 53.25, 53.48 | 6.12, 6.28 | 12.38, 12.59 |

B. Hydrogenation of 1,3-Dinitroadamantane

A reaction vessel containing 9.7 parts of 1,3-dinitroadamantane obtained by the procedure outlined in the foregoing section, 109 parts of ethanol, and approximately 17.5 parts of Raney nickel (wet with methanol) was pressurized to 50 pounds per square inch gage by hydrogen and heated to 50–60° C. The reaction continued until the absorption of hydrogen ceased, i.e., approximately 5 hours. The catalyst and solvent were removed from the product mixture by filtration and vacuum distillation, respectively, to give a substantially quantitative yield of the diamine.

Vapor chromatography showed that only one component was present in the product. The extremely hygroscopic product was identified by preparing the picrate derivative according to the procedure of Shriner and Fuson (The Systematic Identification of Organic Compounds, page 171 (1948)). The yellow picrate melted and decomposed at approximately 300° C. when a crystal of the compound was heated on a hot-stage microscope. The preceding data agree with the melting point reported in the literature (Berichte 74, 1771).

The structure of the 1,3-diamine was confirmed by preparing the known benzamide derivative. To a mixture containing 0.5 part of the diamine and 5 parts of water was added 1.8 parts of benzoyl chloride. The resulting reaction mixture was stirred for one hour and treated with petroleum ether (B.P. 60–90° C.). The white crystalline material was filtered, washed with petroleum ether (B.P. 60–80° C.), and recrystallized from ethanol. The resulting white solid had a melting point of 247–8° C. which agreed with the melting point given in the literature for the 1,3-dibenzamidoadamantane (248° C.). The elemental analysis of the derivative prepared as described gave the following results:

|  | C | H | N |
|---|---|---|---|
| Calcd. for $C_{24}H_{26}N_2O_2$ | 76.97 | 7.00 | 7.48 |
| Found | 76.94, 77.01 | 6.98, 7.13 | 7.21, 7.27 |

The identity of the hydrogenation product was further confirmed by the following procedure. Approximately 1.2 parts of the diamine was mixed with 1.7 parts of phenyl isocyanate. The mixture emitted heat and solidified to yield 2.5 parts of a pale-yellow powder which was washed with petroleum ether. Recrystallization from hot pyridine, followed by treatment with charcoal, and partial precipitation in methanol and water at 70° C. and filtration at room temperature yielded 1 part of a white solid. After being washed with petroleum ether, the white solid, assumed to be the 1,3-bis(phenylureido) adamantane, gave the following elemental analysis:

|  | C | H | N |
|---|---|---|---|
| Calcd. for $C_{24}H_{28}N_4O_2$ | 71.26 | 6.98 | 13.85 |
| Found | 71.20, 71.41 | 6.86, 6.97 | 13.41, 13.49 |

The nitration step can be conducted in two stages if desired. The following example represents one method of synthesizing 1,3-diaminoadamantane via a two-step nitration followed by catalytic hydrogenation of the resulting product.

EXAMPLE 2

A. *Mononitration of Adamantane*

A reaction vessel containing 68 parts of adamantane and 524 parts of glacial acetic acid was pressurized to 500 pounds per square inch gage by nitrogen and heated to 140° C. Subsequently, 90 parts of concentrated nitric acid (70%) was introduced into the reactor at a rate of approximately 9 parts per minute. After being heated for fifteen minutes, the reaction mixture was cooled to room temperature and diluted with water to precipitate the solid products, which were filtered and dried. The crude product was slurried with 79 parts of methanol, 150 grams of water, and 17 grams of potassium hydroxide. After the slurry was diluted with additional water, the alkali-insoluble material was extracted by petroleum ether, and the resulting extracts were washed with water and dried over magnesium sulfate. Concentration of the dried solution followed by recrystallization from methanol and subsequent sublimation at 80–90° C. and reduced pressure afforded a white, waxy product having a melting point of 158.5–159.0° C. (sealed capillary).

Elemental analysis of the isolated product gave the following results:

|  | C | H | N |
|---|---|---|---|
| Calcd. for $C_{10}H_{15}NO_2$ | 66.27 | 8.34 | 7.73 |
| Found | 66.22, 66.36 | 8.34, 8.46 | 7.39, 7.50 |

Vapor chromatography showed that only a single component was present and the infrared spectrum of the product contained absorption bands at 6.52μ and 7.32μ.

B. *Nitration of Tertiary Mononitroadamantane*

A reaction vessel containing 47.2 parts of tertiary mononitroadamantane and 370 parts of glacial acetic acid was heated to 170° C. and pressurized to 600 pounds per square inch gage by nitrogen. Over a nine-minute interval, 72 parts of concentrated (70%) nitric acid was introduced into the reaction mixture. After the addition was completed, the reaction conditions were maintained for fifteen minutes. The reaction mixture was cooled, diluted by water, and filtered. The precipitate was slurried with 120 parts of methanol, 150 parts of water, and 17 parts of potassium hydroxide for an extended period of time. The alkali-insoluble products were separated and extracted by petroleum ether to yield 21.5 parts of a white solid having a melting point of 211–213.5° C.

The product was identified as 1,3-dinitroadamantane by the methods outlined in Example 1. Vapor chromatography showed that the product contained about 87% of the desired dinitro derivative.

C. *Hydrogenation of the 1,3-Dinitroadamantane*

The hydrogenation of 1,3-dinitroadamantane obtained by the preceding method was effected substantially as described in Example 1 except that a larger charge of the dinitro compound was employed. After working up the reaction mixture as outlined in Example 1, a 92.4% conversion to the diamine was obtained.

The diamine was identified as described before. Additionally, the dihydrochloride derivative was made by bubbling anhydrous hydrogen chloride into an ether solution of the diamine. The following elemental analysis was obtained for this derivative:

|  | C | H | N |
|---|---|---|---|
| Calcd. for $C_{10}H_{20}N_2Cl_2$ | 50.25 | 8.43 | 11.71 |
| Found | 49.49, 49.58 | 8.62, 8.59 | 11.84, 12.02 |

EXAMPLE 3

*Utility of the 1,3-Diaminoadamantane as a Curing Agent for Epoxy Resins*

The epoxy resin used was a liquid condensation product of 2,2-bis(4-hydroxyphenyl)propane and epichlorohydrin (epoxide value, 0.52 equivalent per 100 grams of resin) produced and marketed by the Shell Chemical Corporation under their registered trademark "Epon," grade 828. 1,3-diaminoadamantane in the amount of 5 parts was mixed at room temperature with 25 parts of the epoxy resin, and the mixture was cured by heating at 120° C. for two hours. The resulting casting was clear and colorless and, after being cured at 180° C. for twenty-four hours, had a heat-distortion temperature (ASTM Method D648–45T) of 131° C.

The use of the 1,3-diaminoadamantane prepared by the process of the invention to cure epoxy resins results in clear, colorless thermoset castings having satisfactory heat-distortion temperatures. The diamine, being a solid, can be used to particular advantage in curing solid epoxy resins. Essentially no reaction occurs between the present amine and solid epoxides when the two components are mixed and stored at ambient temperature. As will be recognized by fabricators and users of epoxy resin formulations alike, this property permits premixing of the components under carefully controlled conditions rather than at the site of use.

As is illustrated by the preceding examples, the present invention provides a process for producing 1,3-diaminoadamantane, useful as a polymer intermediate and as a crosslinking agent for epoxy resins, by means of synthesizing the tertiary mononitroadamantane and, subsequently, the ditertiary dinitroadamantane, both of which are novel compositions of matter. The predominant production of the tertiary mono- or dinitroadamantane by means of the process of the present invention is very surprising since statistically there are twelve secondary hydrogens and only four tertiary hydrogens. Adamantane, utilized as the starting material in the present process, is readily obtainable by means of the method disclosed in copending application Serial Number 767,790, filed on October 17, 1958, now U.S. Patent No. 2,937,211, by Richard E. Ludwig and assigned to the present assignee wherein the thermal rearrangement of tetrahydrodicyclopentadiene to adamantane in the presence of anhydrous hydrogen fluoride and boron trifluoride is described.

The specific concentration of nitric acid is not critical to the operability of the present process. Some nitration to the desired dinitro derivative will occur with both dilute and concentrated acid. We have found, however, that superior yields of the tertiary dinitro derivative are obtained by utilizing relatively concentrated nitric acid, i.e., 40–80%, preferably 70%. Although we do not wish to be limited by theory, apparently the unique molecular structure of adamantane causes extraordinary chemical stability. Consequently, even when severe conditions are employed, oxidation does not occur to any substantial degree. Obviously, as the concentration of the nitric acid is increased above the preferred range, the formation of oxidation products does increase. Therefore, for maximum product recovery we prefer to utilize nitric acid below 80% concentration. On the other hand, as the concentration of nitric acid is decreased, the rate of reaction correspondingly decreases. Thus, we prefer to employ nitric acid above 40% concentration.

The stoichiometry of the dinitration of adamantane via nitric acid requires the presence of two moles of nitric acid per mole of adamantane. Due to the tendency of the nitric acid to decompose and the dilution factor, we prefer to use an excess of the acid, i.e., approximately a 4/1 molar ratio of nitric acid to adamantane.

The reaction temperature is, to a great extent, a variable function dependent on the other reaction conditions, i.e., concentration of nitric acid, pressure, time, etc. However, temperatures of below 100° C., lead to, at most, only minor amounts of the mononitro derivative. Generally speaking, with nitric acid of approximately 70% concentration, temperatures of 120–150° C. result in the formation of the mononitroadamantane, whereas higher temperatures favor the dinitro product. In most cases, the best yields of the dinitro derivative are obtained by a two-stage reaction, i.e., the temperature during the first phase being between 120° and 150° C. and that of the second phase being above 150° C. If desired, the product formed in the first phase may be isolated and, as shown in Example 2, is predominantly the mono derivative, which is a novel composition of matter. The preferred embodiment of the present invention is exemplified in Example 1 wherein the intermediate nitration product is not recovered. Obviously, this is the more practical method to synthesize the diamino derivative. It will also be recognized by those skilled in the art that, if desired, the reaction temperature may be maintained at only one temperature, the percent yield being directly proportional to the specific temperature chosen, within the range defined in the preceding. In this case, however, the formation of by-products, such as oxidation products, is increased somewhat.

Another of the critical features of the present invention which determines the amount of product recovered is the pressure. Sufficient pressure to maintain at least a part of the reactants, i.e., the adamantane and the nitric acid, in the liquid phase is required. Generally, we have found that pressures above 300 pounds per square inch gage are desirable. The upper limit of pressure is determined by economical, rather than chemical, considerations. Pressures above 1000 pounds per square inch gage will generally not be used.

For nitration to occur in any substantial amount, the nitric acid and adamantane must be mutually miscible. If nitric acid of less than 80% concentration is employed, the miscibility with the adamantane is, at best, very small. As stated in the foregoing, generally, nitric acid of above the stated concentration leads to an undesirable amount of oxidation products. Consequently, in order to obtain nitration to any appreciable extent, a solvent must be added, said solvent being relatively inert under the reaction conditions. Although only glacial acetic acid was employed in the examples of the instant specification, the use of other solvents is contemplated and within the scope of the present invention. For instance, aqueous acetic acid and phosphoric acid are considered to be satisfactory solvents.

In the hydrogenation step of the present process, we found that Raney nickel was a very effective catalyst. However, the use of other metals and mixtures thereof known to catalyze the reduction of nitro groups to amine groups is contemplated and within the scope of the present invention. Particularly suitable are the metals of Group VIII of the periodic table, i.e., iron, cobalt, nickel, ruthenium, rhodium, palladium, osmium, iridium, and platinum. In the hydrogenation catalyzed by Raney nickel, a small amount of heat is required to obtain quantitative reduction in economical reaction times.

The invention has been described in detail in the foregoing. However, it will be obvious to those skilled in the art that many modifications not specifically mentioned are within the scope of the present invention. Accordingly, we intend to be limited only by the following claims.

We claim:
1. Nitro adamantane selected from the group consisting of tertiary mono- and dinitroadamantane.
2. 1,3-dinitroadamantane.
3. A process for preparing 1,3-dinitroadamantane which comprises reacting adamantane with 40% to 80% nitric acid at a temperature of 120° C. to 200° C. and a pressure of 300 to 1,000 pounds per square inch in the presence of glacial acetic acid and at least 2 moles of said nitric acid for each mole of adamantane.
4. A process for preparing 1,3-dinitroadamantane which comprises reacting adamantane with 40% to 80% nitric acid at a temperature of 120° C. to 150° C. and a pressure of 300 to 500 pounds per square inch in the presence of glacial acetic acid and at least 1 mole of said nitric acid for each mole of adamantane, reacting the thereby formed tertiary mononitroadamantane with 40% to 80% nitric acid at a temperature of 150° to 200° C. and a pressure of 500 to 1,000 pounds per square inch in the presence of glacial acetic acid and at least 1 mole of said nitric acid for each mole of adamantane.

References Cited in the file of this patent

UNITED STATES PATENTS

| | | |
|---|---|---|
| 2,551,027 | Long | May 1, 1951 |
| 2,583,048 | Hannum et al. | Jan. 22, 1952 |
| 2,586,512 | Burtner et al. | Feb. 19, 1952 |
| 2,828,313 | Scholz et al. | Mar. 25, 1958 |
| 2,885,439 | Zienty | May 5, 1959 |

OTHER REFERENCES

Landa et al.: Chemical Abstracts, vol. 27, p. 5949 (1933), Abstract of Chemie and Industrie, Special No., pp. 506–10 (1933).

Hass et al.: Industrial and Engineering Chemistry, vol. 39, No. 7, pp. 817–821 (1947).

Degering: "An Outline of Organic Nitrogen Compounds," 1950, pages 65, 66 and 70.